United States Patent [19]

Gerlach et al.

[11] Patent Number: 5,142,225

[45] Date of Patent: Aug. 25, 1992

[54] APPARATUS FOR MEASURING SMALL DISPLACEMENTS BY USING BARBERPOLE SENSORS PRODUCING A CYCLICAL VOLTAGE HAVING A MARK/SPACE RATIO INDICATIVE OF POSITION

[75] Inventors: Guenter Gerlach, Rastatt; Erich Zabler, Stutensee; Georg Riedel, Karlsruhe; Walter Antoni, Rülzheim, all of Fed. Rep. of Germany

[73] Assignee: Robert Bosch GmbH, Stuttgart, Fed. Rep. of Germany

[21] Appl. No.: 606,056

[22] Filed: Oct. 29, 1990

[30] Foreign Application Priority Data

Nov. 14, 1989 [DE] Fed. Rep. of Germany ............... 89121064[U]

[51] Int. Cl.⁵ ............... G01B 7/14; G01B 7/30; G01P 15/08; G01L 9/14
[52] U.S. Cl. ............... 324/207.21; 73/517 R; 73/728; 324/207.12; 324/207.23; 324/207.24; 324/207.25
[58] Field of Search ............... 324/207.12, 207.15, 324/207.16, 207.17, 207.18, 207.19, 207.20, 207.21, 207.23, 207.24, 207.25; 340/870.32, 870.33, 870.35; 331/65; 73/517 R, 517 A, 722, 728, DIG. 3

[56] References Cited

U.S. PATENT DOCUMENTS

| | | | |
|---|---|---|---|
| 3,474,332 | 10/1969 | Brown | 324/207.16 |
| 3,973,191 | 8/1976 | Zabler | 324/207.16 |
| 4,115,923 | 9/1978 | Smith et al. | 324/207.16 X |
| 4,140,971 | 2/1979 | Blincoe | 324/207.16 |
| 4,408,169 | 10/1983 | Fraser | 331/65 |
| 4,603,295 | 7/1986 | Heemstra | 324/207.24 X |
| 4,841,245 | 6/1989 | Fiori, Jr. | 324/207.18 X |
| 4,992,733 | 2/1991 | Griebeler | 324/235 X |

FOREIGN PATENT DOCUMENTS

2176616 12/1986 United Kingdom ............... 324/174

*Primary Examiner*—Gerard R. Strecker
*Attorney, Agent, or Firm*—Michael J. Striker

[57] ABSTRACT

An apparatus for measuring small displacements, either linear or angular, employ a pair of spaced "barber pole" or other magnetic field sensitive elements and a movable magnet, in which the exact position of the movable magnet is determined from the voltages sensed at the two elements. The voltages are evaluated in a circuit which produces a rectangular voltage or equivalent, in which the mark/space ratio equates to the position of the magnet between the two sensors.

14 Claims, 7 Drawing Sheets

APPARATUS FOR MEASURING SMALL DISPLACEMENTS BY USING BARBERPOLE SENSORS PRODUCING A CYCLICAL VOLTAGE HAVING A MARK/SPACE RATIO INDICATIVE OF POSITION

BACKGROUND OF THE INVENTION

The present invention relates to an apparatus for measuring small displacements.

It has been proposed to measure small displacements accurately using sensors sensitive to magnetic fields and changes in magnetic fields. The effect referred to is not of voltage generation due to a conductor cutting magnetic lines, but is a static effect of a magnetic field on a sensor which is affected thereby. Among sensors useful for this are so-called 'barber pole' elements, and Hall pressure sensors. Relative movement between a sensor and a magnet can effect a change in electrical output, and an array of sensors in line or in two dimensions gives accurate data concerning the position of the movable element. The most practical arrangement uses an array of barber pole elements at discrete spacings, with a magnet movable relative thereto. A practical use is with a pressure sensor having a deflectable membrane, a permanent magnet being mounted on the latter and a row of elements mounted on the casing. Apparatus of this general type has the disadvantage that since the voltage output of each barber pole element is at a discrete level, in the general case when the magnet lies between two elements, an interpolation must be carried out to decide the exact location of the magnet. Only if the magnet were directly above a barber pole element would this give a zero output, with consequent certainty as to the position of the magnet. In the past, the interpolation has been made using separate microcomputer facilities, which is expensive, and is even then only an approximation.

SUMMARY OF THE INVENTION

Accordingly, it is an object of the present invention to provide an apparatus for measuring small displacements or the static position of a member, which is cheaper to implement and which is insensitive to temperature.

It is also an object of the present invention to provide an apparatus which is also insensitive to the spacing between the magnet and the sensor array.

In keeping with these objects and with others which will become apparent hereinafter, one feature of the present invention resides, briefly stated, in an apparatus for measuring small displacements with a fixed linear array of magnetic field sensitive elements and a magnetic member movable relative to the array, whereby the position of the magnetic member between two adjacent elements can be determined from the respective sensed values from the two elements, in which in accordance with the invention an evaluation circuit is provided which receives the two sensed values and in response produces a rectangular voltage or its equivalent in which the mark/space ratio equates to the position of the magnet between the two electrodes.

In accordance with the invention, the magnetic member may be a permanent magnet. On the other hand, it can be a soft magnetic piece which by its movement varies the magnetic field provided by a separate, fixed permanent magnet. The magnetic member may move linearly or in an arc.

In all these cases, the form of the evaluation circuit chosen provides a measurement device which in particular is insensitive to temperature, and which provides an output which does not need further processing in a computer for the purpose of interpolation.

In accordance with another feature of the present invention, the evaluation circuit has an inverted Schmitt trigger and an RC integrator, with feedback, which provides a sawtooth voltage output. The sawtooth voltage output can be supplied to a comparator which provides a rectangular waveform.

Still another feature of the present invention is that the sensed values are amplified and are switched so as to be applied alternately to the input of the Schmitt trigger.

Still another feature of the present invention is that the array of sensitive elements lie in a single plane and the magnetic member moves in a different substantially parallel plane. The elements can lie in a first line side-by-side and the magnetic member can move in a straight line parallel to the first line. On the one hand, the elements can be disposed in an arcuate array and the magnetic member can move in corresponding arc, for measurement of angular displacement.

In accordance with another feature of the present invention, additional elements are provided in mirror-image positions and their sensed values are used in the evaluation circuits so as to compensate for external magnetic fields. A second magnetic member can move in relation to the additional elements.

In accordance with a further feature of the present invention a bias field can act on the sensitive elements.

A further magnetic member can be associated with the first and the two members can move on opposite sides of the array.

The array of the sensitive elements can lie in a single plane, while the magnetic member can move in an arc in a different plane, at right angles to the single plane and including the sensitive elements.

The magnetic member can be formed as a soft iron piece and the sensitive elements can be mounted in a static magnetic field which is modified according to the position of the magnetic member.

Finally, two elements can be aligned end-to-end and one rotated 180° relative to the other, and the magnetic member can move in an arc for measurement of angular displacement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings

DESCRIPTION OF THE PREFERRED EMBODIMENTS

Figure 1:
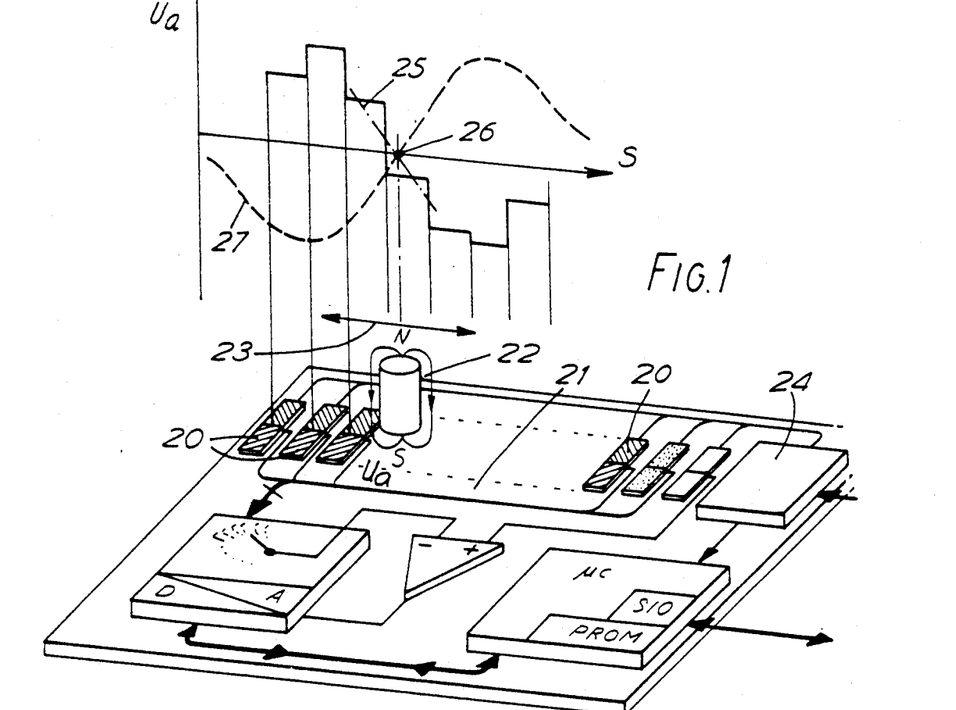
FIG. 1 shows the principle of apparatus for measuring small displacements and illustrate its output signal.

In FIG. 1, a series of 'barber pole' sensors 20 are spaced at equal intervals along a fixed board 21. A permanent magnet 22 is attached to a movable member (not shown), the displacement or position of which in the direction of the arrow 23 is to be measured. The effect of the magnet on each barber pole sensor 20 is to vary its resistance, and a voltage is applied across each sensor by a voltage source 24. The value of $U_a$ is 0v when the magnet 22 is directly above a sensor, and has a positive value for each sensor 20 to the left of the magnet 22 and a negative value for each sensor 20 to the right.

The graph drawn above the apparatus shows an example of the values of $U_a$ for each sensor 20, and has a step-like form with a discrete value of $U_a$ for each sensor. There is no sensor with a value of 0v because the magnet 22 does not stand directly above a sensor. To identify its position a crude linear interpolation can be made by drawing line 25 between equivalent points of the adjacent steps on the graph. The zero crossing point 26 can thus be calculated as a distance s along the horizontal axis.

However, this interpolation is relatively crude, since the line should theoretically be a curve. Moreover, the values measured vary depending on external factors such as temperature and the spacing of the path of the magnet 22 from the sensors; only at the true zero crossing i.e. directly below the magnet, do these factors not play a part.

The true curve (the static curve) which it is desired to approximate by the straight line is in fact the precise inverse of a curve (the motion curve) which is obtained by moving a magnet steadily past a single barber pole sensor and measuring its output voltage at its centre. This curve is shown as dashed line 27.

Figure 2:
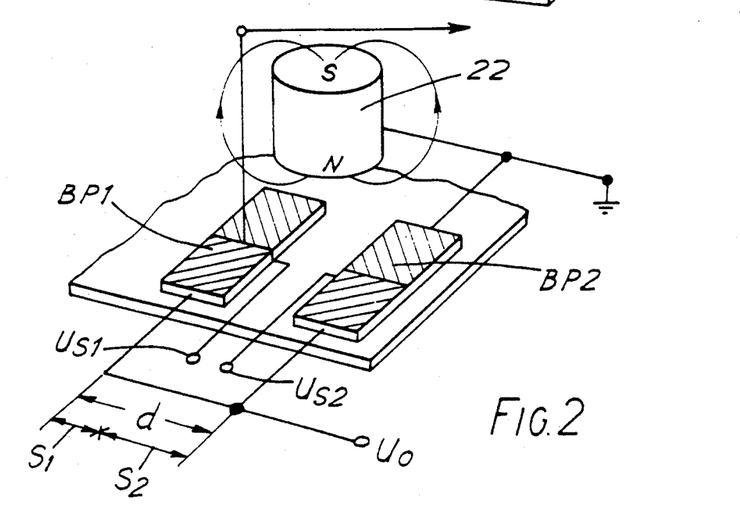
FIG. 2 shows to an enlarged scale the relationship of only two sensors.
Figure 3:
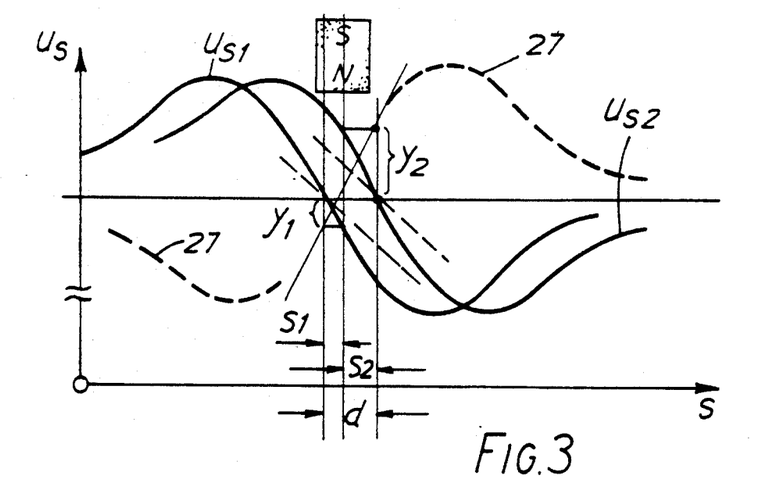
FIG. 3 shows the voltage outputs produced by movement of the member.

FIG. 2 shows diagramatically two sensors 20 marked BP1 and BP2 and a movable magnet 22, with the parameters marked. The magnet is assumed to lie between the two sensors at a point s such that $S_1 + S_2 = d$. The electrical outputs of BP1 and BP2 are illustrated in FIG. 3 in the form of the two curves $U_{s1}$, $U_{s2}$ which are the inverse of the motion curves. At the precise point S, the two voltages are $Y_1$ and $Y_2$, $Y_1$ in the case shown being negative. By appropriate processing of these two values, the exact position of S can be determined.

Figure 4:
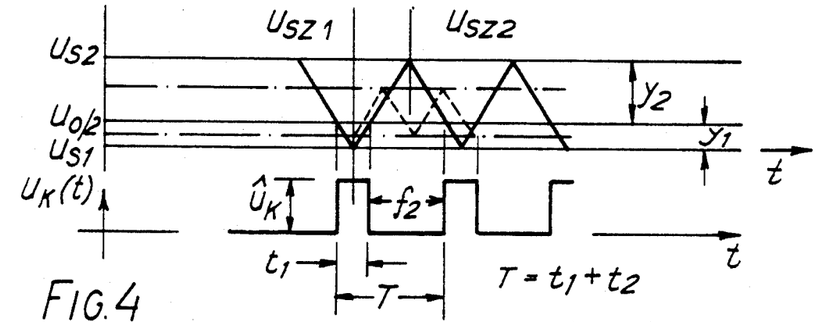
FIG. 4 shows the conversion to analogue output.

According to the invention, a circuit is provided to process the values automatically using the principles illustrated in FIG. 4. The circuit is set to receive the values $U_{s1}$ and $U_{s2}$ and to generate a saw-tooth waveform $U_{SZ1}$ which oscillates between the limits of the two voltages $Y_1$ and $Y_2$ either side of a datum voltage $U_o/2$.

The voltage $$U_{sz} = \frac{U_o}{\tau} \cdot t$$

and the times are calculated as follows:

$$Y_1 = \frac{U_o}{\tau} \cdot \frac{t_1}{2} ; t_1 = \frac{\tau}{U_o/2} \cdot Y_1$$

$$Y_2 = \frac{U_o}{\tau} \cdot \frac{t_2}{2} ; t_2 = \frac{\tau}{U_o/2} \cdot Y_2$$

($\tau$ = time constant, and $t_1 + t_2 = T$)

Both the amplitude and the frequency are dependant on the spacing between the magnetic member and the sensors, and on temperature, as is illustrated by the dotted waveform $U_{sz2}$ for a larger spacing; the amplitude decreases and the frequency increases. In fact, the slopes of the waveform are the same.

This sawtooth waveform then converts to a pulse width modulated square waveform $U_K(t)$ in which $t_1$, $t_2$ are proportional to $s_1$, $s_2$. The value $U_K(t)$ is $$U_K(t) = \begin{cases} u_K \text{ for } U_{sz} \leq U_o/2 \text{ or } t_1 \\ o \text{ for } U_{sz} > U_o/2 \text{ or } t_2 \end{cases}$$

$$= u_K \frac{t_1}{T}$$

Thus $$U_K = u_K \frac{t_1}{t_1 + t_2} = u_K t_1/T = u_K \frac{y_1}{y_1 + y_2} = \frac{s_1}{s_1 - s_2} \cdot U_K$$

$$U_K = u_K s_1/d$$

The mean value of $U_k$ thus varies between 0 and $U_k$, proportional to s, the position of the magnetic member, and independent of its spacing above the sensors. Consequently, the value of the mark/space ratio remains the same, thus freeing the measuring apparatus of its spacing and temperature dependence.

Figure 5:
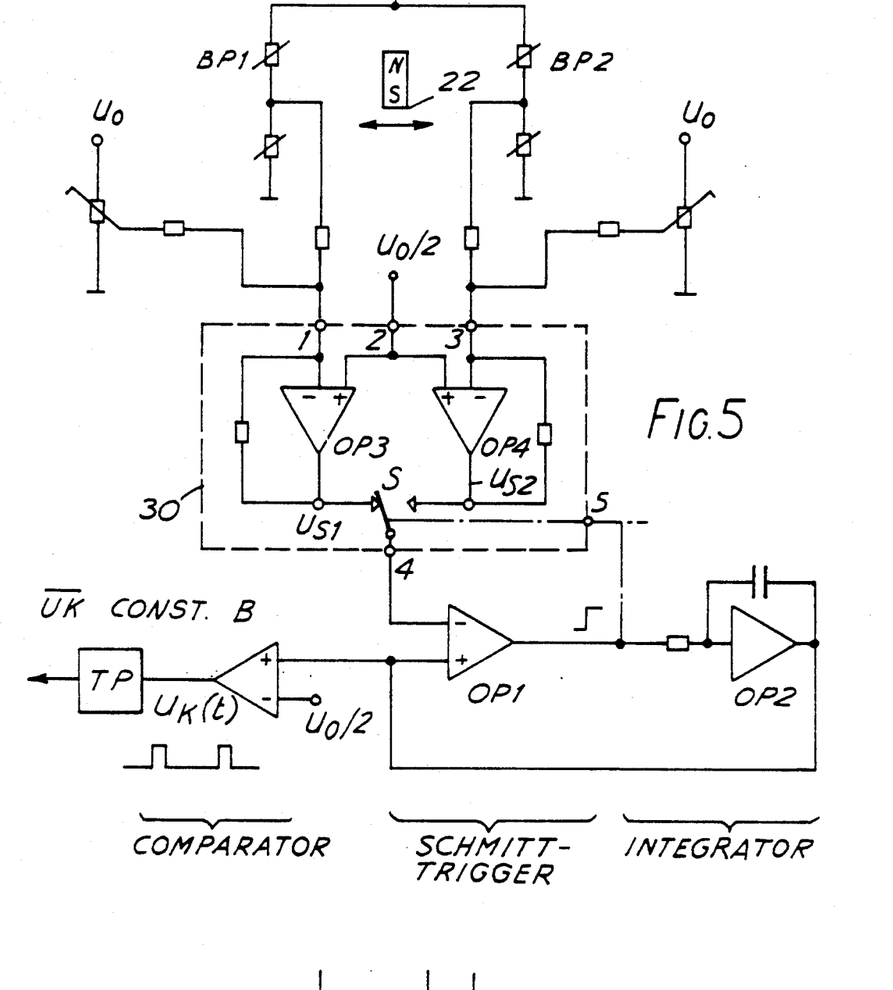
FIG. 5 shows a first circuit for providing such an output.

The circuit required to perform this evaluation is illustrated in FIG. 5. This is a known self-oscillating circuit for generating sawtooth and square waveforms, and consists of an inverting Schmitt trigger OP1 and an RC integrator OP2 with a time constant $\tau = RC$ in series. The sawtooth output is fed back to trigger OP1, and to a comparator which also receives the value $U_o/2$. A low pass filter TP provides an output voltage $\overline{U}_k$ proportional to distance s from the square waveform $U_K(t)$ at the output of the comparator.

The input to the Schmitt trigger OP1 consists of the amplified values of the barber pole voltages $U_{s1}$ and $U_{s2}$ used alternately. They are selected by an electronic switch S at the output of operational amplifiers OP3 and OP4. The switch is controlled by a feed back from the output of trigger OP1.

Figure 6:
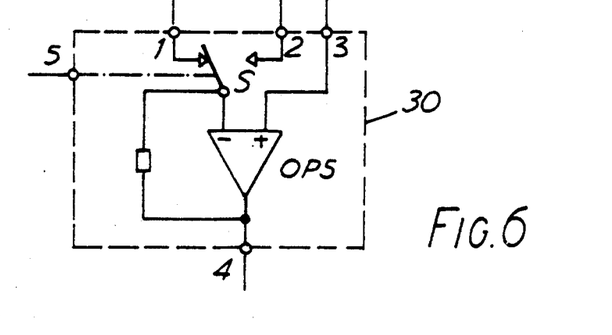
FIG. 6 shows a circuit modification.

In a slight modification of this circuit, the circuitry within dashed line 30 in FIG. 5 is replaced by the block shown in FIG. 6. The switch S is placed ahead of the amplifier OP5, thus reducing the whole circuit requirement to four operational amplifiers, which are commercially available on a single chip.

Figure 7:
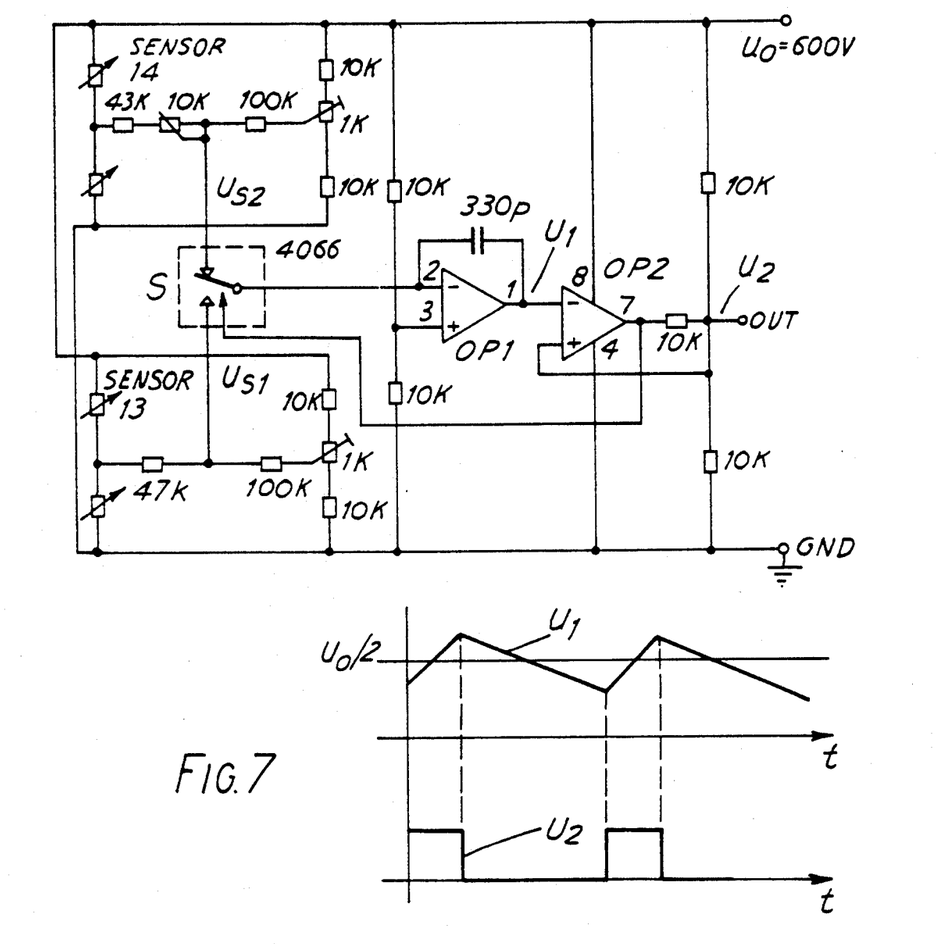
FIG. 7 shows an alternative circuit.

An alternative and simpler evaluation circuit is shown in FIG. 7, together with its output waveform. The basis is again the series connection of an inverting Schmitt trigger OP1 and an integrator OP2. However, the voltage $U_{S1}$ and $U_{S2}$ serve as a switchable integration voltage for trigger OP1, while the threshold voltage is constant. The outputs $U_1$ and $U_2$, have the form illustrated, and again $t_1$ and $t_2$ are dependent on $S_1$ and $S_2$, although $T=t_1+t_2$ in this case increase with an increase in the spacing.

Figures 8, 9:
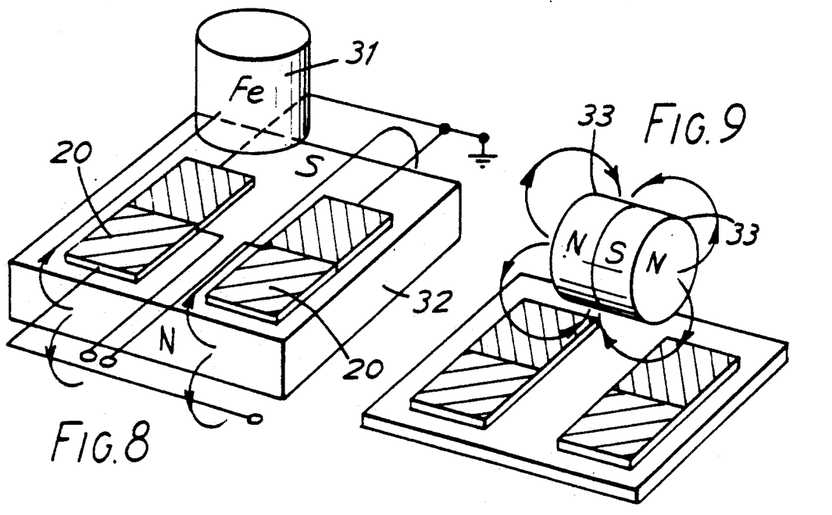
FIGS. 8 and 9 show two further physical arrangements.

FIGS. 8 and 9 show alternative arrangements of magnetic member and sensors. In FIG. 8, a soft iron member 31 is used in place of a permanent magnet, and the field is provided by a magnetic strip 32 upon which the sensors 20 are mounted. The strip is poled transversely, as shown. Movement of member 31 causes modification of the field surrounding the sensors and production of essentially the same voltage curves. The strip 32 may also be used in addition in the FIG. 1 embodiment. In FIG. 9, the magnetic axis of two adjacent cylindrical permanent magnets 33 lies parallel with the direction of motion, and likes poles abut.

Figure 10:
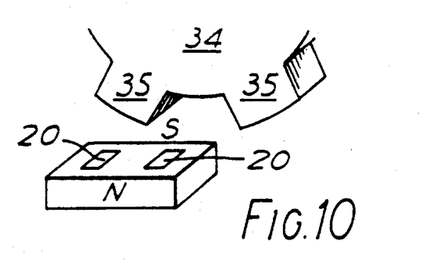
FIG. 10 shows an arrangement for measuring angular movement.

In FIG. 10, a soft magnetic member 34 has the form of a toothed wheel, with teeth 35 rotating so as to pass adjacent to the sensors 20. This operates well so long as at least one tooth 35 lies in the magnetic field.

For this embodiment, the fact that the calculated output is independent of the spacing of magnetic member and sensors is of crucial importance.

Figure 11:
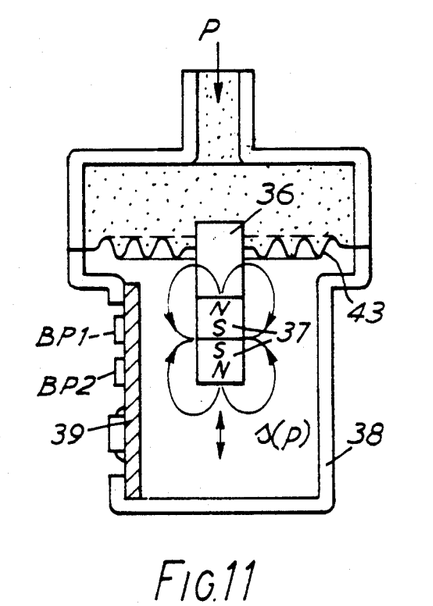
FIGS. 11 and 12 shows two practical applications for according to the invention.

FIG. 11 illustrates the use of the invention in a pressure sensor. Fluid pressure acts on a membrane 43, causing corresponding deflection of a rod 36 carrying permanent magnets 37 in a configuration similar to FIG. 9. The rod 36 lies within a housing 38, in the wall of which is a sensor unit 39 consisting of two barber pole elements. The outputs are fed to a circuit as described above. The very small membrane displacements sensed are an accurate measure of the fluid pressure P applied.

Figure 12:
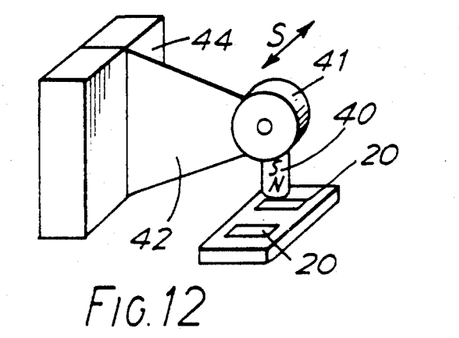

FIG. 12 shows a different application. Here, the permanent magnet 40 is attached to a mass 41 on the end of a spring 42. The mass deflects under acceleration and deceleration of the body 44 to which the spring is fixed. The sensor outputs can thus give a measure of the acceleration and deceleration.

Two further embodiments illustrate a rather different system for measuring angular displacements. In these cases, the plans of movement of the magnetic member is parallel with the plane of the sensors, rather than normal to it as in FIG. 10.

Figure 13:
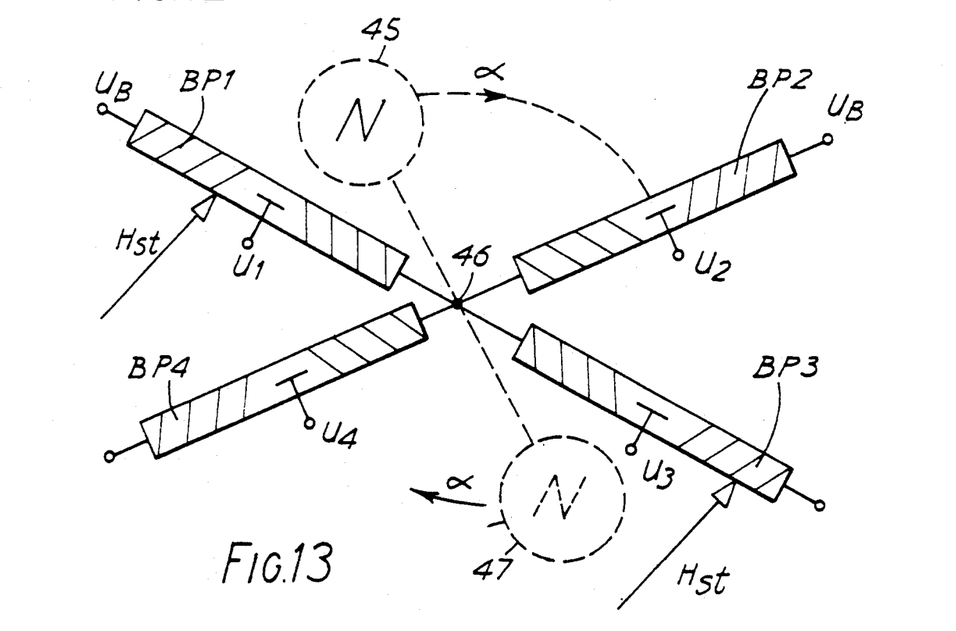
FIG. 13 shows a different system of measuring angular displacement which is unaffected by a background magnetic field.

FIG. 13 illustrates in schematic plan view a sensor array with four barber pole sensors. The moving magnetic member 45 swings about a centre point 46 directly above the two barber poles sensors BP1, BP2 thus varying its position between them. The sensors in this case are positioned, not side-by-side as in previous embodiments, but at an angle to each other. It will be realized that this arrangement is similar to but covers a larger angle than the embodiment in FIG. 12. The arcuate swing of the magnetic member 45 between the angles sensors BP1, BP2 can be considered as simply a variation of the spacing between them.

Two further improvements are introduced to increase the accuracy of measurement of angle, derived from the values of $s_1$ and $s_2$ (or $t_1$ and $t_2$) output by the circuitry. In order to compensate for background magnetic fields $H_{st}$ (e.g. that of the earth) which cause distortion of the results when motion is not in a straight line, two further complementary sensors BP3 and BP4 can be introduced symetrically about the point 46. Further, a second symetrical moving magnet 47 may be introduced. By combination and averaging of the outputs of BP1 and BP3 and of BP2 and BP4, the distortions and errors can be compensated and eliminated.

Figure 14:
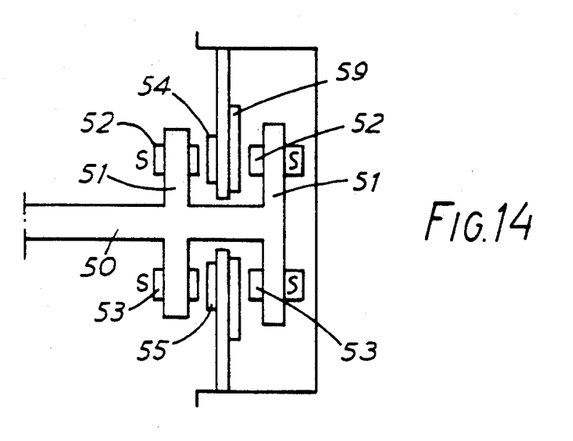
FIG. 14 shows a practical embodiment of a similar system.
Figure 15:
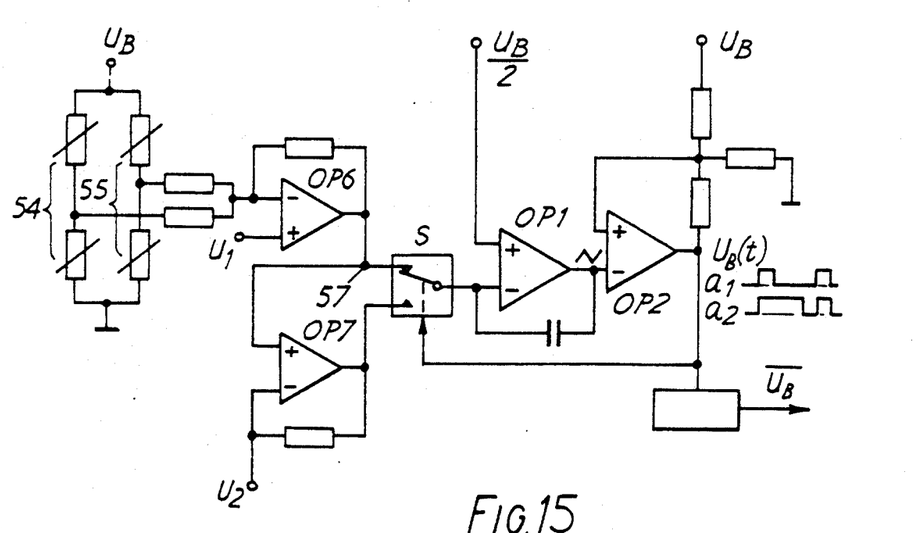
FIG. 15 shows an evaluation circuit for the latter.

FIGS. 14 and 15 illustrate a practical embodiment of the principles just discussed. FIG. 14 shows a side view of a rotary shaft 50 which carries two transverse arms 51. On the arms 51 are two pairs 52, 53 of permanent magnets, each pair with like poles facing. Between the magnet poles is a fixed support for two barber pole sensors 54, 55, positioned in line symetrically of the shaft 50. The latter is attached for example to a flap valve member of a carburettor so as to measure its angular position, within a limit of about 50°–60°. The apparatus operates in principle similar to FIG. 13. However, it is also subject to severe external magnetic fields, for example if built into the engine of a large vehicle.

A bias ring magnet 59, preferably of plastoferrite is attached behind the sensors. This helps to provide more stable magnetic field and reduces the sensitivity to external fields. The second magnet of each magnet pair has the effect of reducing again the sensitivity to the spacing of the magnet plane and the sensor plane, and also to construction tolerances.

The signals derived from this device are used in the evaluation circuit in FIG. 15. A virtual second sensor pair at 90° to the line of the first is simulated. The output signals $U_1$, $U_2$ of the two sensors define the reference voltage position, and thus the magnitude of the measurement range as well as the linearity. These signals are first averaged before application with $U_1$ to an operational amplifier OP6. By this means, the influence of external distoring magnetic fields is compensated. The output voltage at point 57 is then applied with voltage $U_2$ via a non-inverting amplifier OP7 to the other pole of switch S. This form of circuit has the considerable advantage that exactly the same characteristic curve is used as for analogue interpolation, ensuring an improvement in linearity and temperature performance.

Figure 16:
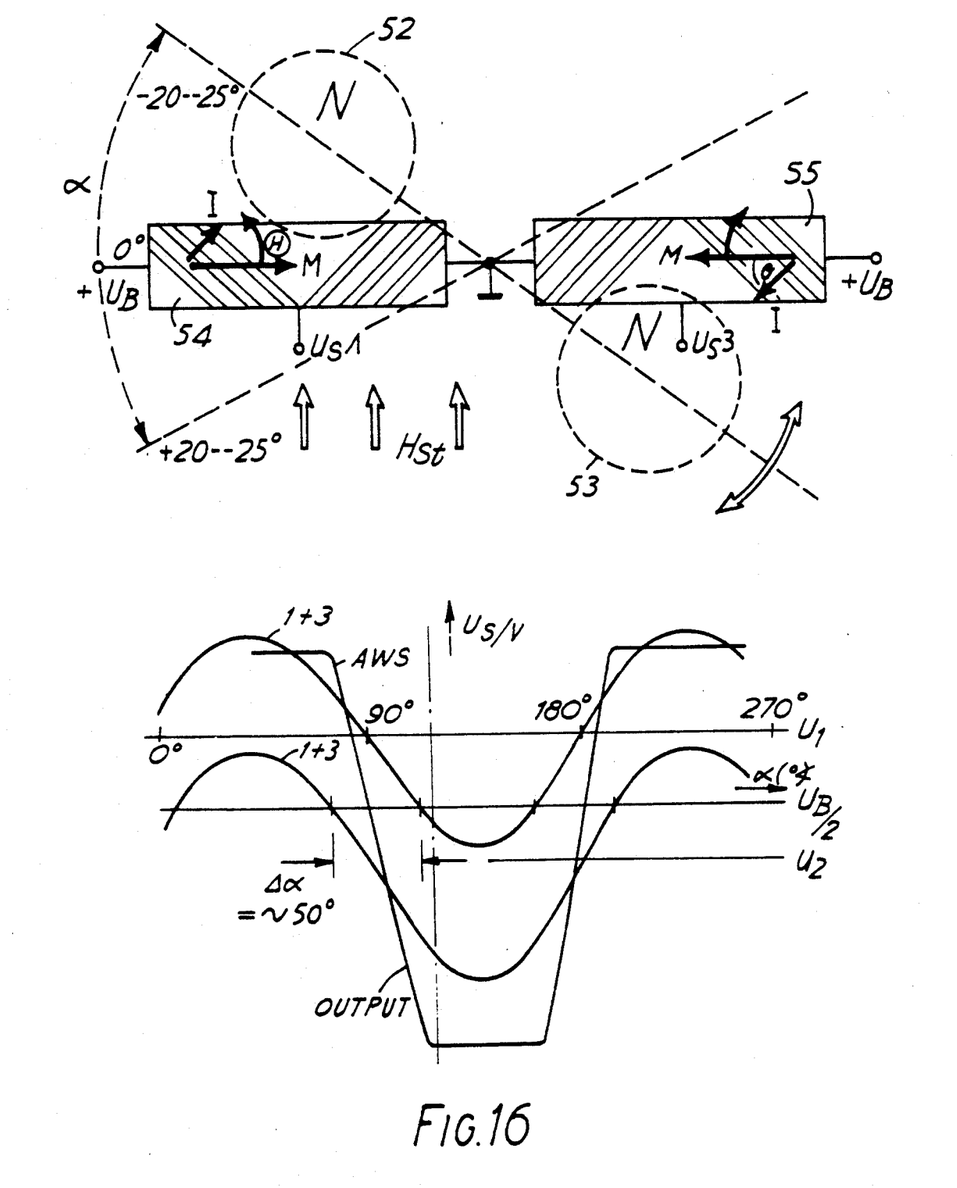
FIG. 16 shows a schematic of the device shown in FIG. 14 for measuring angular displacement using only two sensors.

FIG. 16 illustrates schematically the device of FIG. 14, using only two magnets 52, 53 and a single pair of barber pole elements 54, 55 arranged in line at 180° to each other.

It will be understood that each of the elements described above, or two or more together, may also find a useful application in other types of constructions differing from the types described above.

While the invention has been illustrated and described as embodied in an apparatus for measuring small displacements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An apparatus for measuring small displacements, comprising a fixed array of magnetic field sensitive barberpole elements spaced at equal intervals along said fixed array; a magnetic member movable relative to said array along a path adjacent thereto so that its position between two adjacent ones of said barberpole elements can be determined from voltage values provided by said two adjacent elements in response to changes in resistance of said two adjacent elements caused by said magnetic member; and an evaluation circuit which receives the two voltage values and in response produces a cyclical voltage from which can be derived a mark/space ratio which equates to a position of said magnetic member between said two adjacent elements.

2. An apparatus as defined in claim 1, wherein said array of sensitive elements lie in a single plane, said magnetic member moving in a different substantially parallel plane.

3. An apparatus as defined in claim 2, wherein said elements lie in a first line side-by-side, said magnetic member moving in a straight line parallel to said first line.

4. An apparatus as defined in claim 2, wherein said elements are disposed in an arcuate array, said magnetic member moving in an arc for measurement of an angular displacement.

5. An apparatus as defined in claim 1; and further comprising additional elements provided in mirror-image positions to said first mentioned elements and cooperating with said evaluation circuit so that voltage values of said additional elements are used in said evaluation circuit to compensate for external magnetic fields; and a second magnetic member moving relative to said additional elements.

6. An apparatus as defined in claim 1; and further comprising means for acting with a bias field on said sensitive elements.

7. An apparatus as defined in claim 1, wherein said array of sensitive elements lie in a single plane, said magnetic member moving in an arc in a different plane, at right angles to said single plane which includes said sensitive elements.

8. An apparatus for measuring small displacements, comprising a fixed array of magnetic field sensitive barberpole elements spaced at equal intervals along said fixed array; a magnetic member movable relative to said array along a path adjacent thereto so that its position between two adjacent ones of said barberpole elements can be determined from voltage values provided by said two adjacent elements in response to changes in resistance of said two adjacent elements caused by said magnetic member; and an evaluation circuit which receives the two voltage values and in response produces a cyclical voltage from which can be derived a mark/space ratio which equates to a position of said magnetic member between said two adjacent elements, said evaluation circuit including in series an inverted Schmitt trigger having an input which receives the two sensed values, and an RC integrator connected with the inverted Schmitt trigger, with feedback, which provides a sawtooth voltage output.

9. An apparatus as defined in claim 8; and further comprising a comparator to which the sawtooth voltage output is supplied from said RC integrator and which provides a rectangular waveform.

10. An apparatus as defined in claim 8; and further comprising means for amplifying the voltage values and switching them so as to be supplied alternatingly to an input of said Schmitt trigger.

11. An apparatus for measuring small displacements, comprising a fixed array of magnetic field sensitive barberpole elements spaced at equal intervals along said fixed array; a magnetic member movable relative to said array along a path adjacent thereto so that its position between two adjacent ones of said barberpole elements can be determined from voltage provided by said two adjacent elements in response to changes in resistance of said two adjacent elements caused by said magnetic member; and an evaluation circuit which receives the two voltage values and in response produces a cyclical voltage from which can be derived a mark/space ratio which equates to a position of said magnetic member between said two adjacent elements, additional elements provided in mirror-image positions to said first mentioned elements and cooperating with said evaluation circuit so that sensed values of said additional elements are used in said evaluation circuit to compensate for external magnetic fields; and a second magnetic member moving relative to said additional elements.

12. An apparatus for measuring small displacements, comprising a fixed array of magnetic field sensitive barberpole elements spaced at equal intervals along said fixed array; a magnetic member movable relative to said array along a path adjacent thereto so that its position between two adjacent ones of said barberpole elements can be determined from voltage values provided by said two adjacent elements in response to changes in resistance of said two adjacent elements caused by said magnetic member; and an evaluation circuit which receives the two voltage values and in response produces a cyclical voltage from which can be derived a mark/space ratio which equates to a position of said magnetic member between said two adjacent elements; and a further magnetic member movable relative to said array so that its position between two adjacent ones of said elements can be determined from values sensed from said two adjacent elements and evaluated by said evaluation circuit, said magnetic members moving on opposite sides of said array.

13. An apparatus for measuring small displacements, comprising a fixed array of magnetic field sensitive barberpole elements spaced at equal intervals along said fixed array; a magnetic member movable relative to said array along a path adjacent thereto so that its position between two adjacent ones of said barberpole elements can be determined from voltage values provided by said two adjacent elements in response to changes in resistance of said two adjacent elements caused by said magnetic member and an evaluation circuit which receives the two voltage values and in response produces a cyclical voltage from which can be derived a mark/space ratio which equates to a position of said magnetic member between said two adjacent elements, said magnetic member being a soft iron piece, and said sensitive elements being mounted in a steady magnetic field which is modified according to a position of said magnetic member.

14. An apparatus for measuring small displacements, comprising a fixed array of magnetic field sensitive barberpole elements spaced at equal intervals along said fixed array; a member movable relative to said array along a path adjacent thereto so that its position between two adjacent ones of said barberpole elements can be determined from voltage values provided by said two adjacent elements in response to changes in resistance of said two adjacent elements caused by said magnetic member; and an evaluation circuit which receives the two voltage values and in response produces a cyclical voltage from which can be derived a mark/space ratio which equates to a position of said magnetic member between said two adjacent elements, said array of sensitive elements lying in a single plane and said magnetic member moving in an distance substantially parallel to said plane, said two elements being aligned end-to-end and one is rotated 180° relative to the other, said magnetic member moving in an arc for measuring of an angular displacement.

* * * * *